United States Patent [19]

Vargiu et al.

[11] 3,721,643

[45] March 20, 1973

[54] UNSATURATED POLYESTER RESIN COMPOSITIONS

[75] Inventors: Silvio Vargiu, Sesto S. Giovanni; Beppino Passalenti, Milan, both of Italy

[73] Assignee: Societa Italiana Resine S.P.A., Milan, Italy

[22] Filed: Nov. 18, 1971

[21] Appl. No.: 200,193

[30] Foreign Application Priority Data

Nov. 26, 1970  Italy.............................32209 A/70

[52] U.S. Cl.................................260/40 R, 260/865
[51] Int. Cl. ..............................................C08g 51/04
[58] Field of Search............................260/40 R, 865

[56] References Cited

UNITED STATES PATENTS

| | | | |
|---|---|---|---|
| 3,219,604 | 11/1965 | Fischer | 260/40 R X |
| 3,227,665 | 1/1966 | Fourcode et al. | 260/40 R X |
| 3,467,619 | 9/1969 | Raichle et al. | 260/40 R |

Primary Examiner—Morris Liebman
Assistant Examiner—S. M. Person
Attorney—Richard C. Sughrue et al.

[57] ABSTRACT

Polyester compositions for pre-impregnates comprise 50 – 60 parts resin diluted in styrene, 40 – 50 parts inert filler, up to 1 part magnesium oxide, and catalyst.

17 Claims, No Drawings

UNSATURATED POLYESTER RESIN COMPOSITIONS

The present invention relates to improvements in unsaturated polyester resins; more precisely, it relates to compositions comprising an unsaturated polyester resin and suitable for the preparation of pre-impregnates.

Pre-impregnates are those products which consist of a reinforcing material of the glass fiber type, containing and/or combined with an appropriate resin and suitable for conversion to manufactured articles by hot stamping.

The use of unsaturated polyester resins in the preparation of pre-impregnates is already known in the prior art, the term unsaturated polyester resins referring to the products of polycondensation of polyfunctional alcohols with polyfunctional acids, when a non-aromatic unsaturation is present in one or other class of compounds, in the presence of saturated acids with a modifying action. Normally, for the manufacture of pre-impregnates, an initial stage is to add to the unsaturated polyester resins, diluted by an aryl vinyl product, inert fillers and catalysts which decompose at relatively elevated temperatures.

To these products are then added magnesium oxide which causes an increase in the viscosity of the compositions and, during such an increase in viscosity, the reinforcing materials, generally glass fiber, are impregnated.

Once impregnated, the products which may be stored for more or less long periods of time, are ready to be stamped out under heat.

These pre-impregnates do not however exhibit completely satisfactory qualities.

Particularly noticed is a high rate of water absorption and an undesirable stickiness.

In addition, it has also been observed that the characteristic features of the pre-impregnates are such as to not allow them to be used immediately in the production of the moulded articles, as is often required in practice.

It has also been observed that the manufactured articles obtained by hot stamping of pre-impregnates have a capacity for water absorption which substantially impairs the qualities of the manufactured item itself.

We have found that some of the aforesaid disadvantages, particularly the absorption of water, are avoided or substantially reduced by using high viscosity compositions in the manufacture of the pre-impregnates, these compositions being obtained by adding inert fillers, catalysts and hardening additives and possibly other adjuvants to unsaturated polyester resins which are diluted in styrene.

High viscosity compositions may be obtained by adding to the compositions themselves not inconsiderable quantities of magnesium oxide, the capacity of which to raise the viscosity of compositions for pre-impregnates containing unsaturated polyester resins is already well-known.

The use of not inconsiderable quantities of magnesium oxide does however result in a deterioration of other properties of the pre-impregnate and of the finished product obtained by hot stamping of the pre-impregnate, particularly in the properties of the finished product, for example an increase in tackiness.

The viscosity of compositions for pre-impregnates may also be increased by raising the percentage of inert fillers in the composition. Increasing the percentage of inert fillers will however prejudice the flow properties of the composition under pressure and heat and thus the workability of the pre-impregnate obtained from such compositions.

We have now found that the above-described disadvantages may be avoided in a substantially quantitive manner by the use of unsaturated polyester resins which are highly sensitive to the action of magnesium oxide.

The object of the present invention therefore is to provide unsaturated polyester resins which are highly sensitive to the action of magnesium oxide.

More precisely, the present invention relates to unsaturated polyester resins which, with inert fillers added to them so as to produce a final composition constituted essentially by 50 to 60 percent by weight of the actual resin, the remainder comprising the inert fillers in the presence of an amount of magnesium oxide equal to or less than 1 percent, allowing the final composition itself to achieve a viscosity in excess of 100,000 c.p.s. at room temperature in a period not exceeding 120 minutes.

According to the present invention, unsaturated polycarboxylic acids are reacted with polyhydroxy alcohols in the presence of phthalic acids, so as finally to obtain a resin with an acidity number between 30 and 35 and with a viscosity, measured on the Gardner scale of $Z_2$ to $Z_5$ at room temperature and with 70 percent toluene.

In the preferred form of embodiment of the present invention, maleic and/or fumaric acid are reacted with ethylene and/or propylene glycol and/or pentaerythritol, in a molar ratio of between 0.3:1 and 0.5:1, in the presence of phthalic acids, in such a quantity that the molar ratio between the maleic and/or fumaric acids and the phthalic acids is between 0.5:1 and 2:1. The reaction temperature is preferably between 160° and 200° C. After cooling to 100° C, the product of polycondensation is diluted with styrene in such a quantity that the viscosity of the final product, measured with a Hubbelhode viscosimeter, is comprised in the range from 500 to 2,000 c.p.s. at 25° C.

The resin diluted with styrene is then stirred as inert fillers and catalyst are added as required for setting so that the produce finally obtained has a resin content equal to 50 to 60 percent by weight, the balance consisting essentially of inert fillers.

As catalysts for hardening, it is possible for example to use: cumene hydroperoxide, ditertiary butyl perbenzoate, dicumyl peroxide, tertiary butyl peroxide and other peroxides which decompose at high temperature, preferably in quantities of 0.5 to 3 percent by weight of the liquid unsaturated polyester.

The inert fillers, useful for the purposes of the present invention, are constituted mainly by carbonates, sulphates, kaolin, quartz, slate, titanium dioxide, mica and talcum.

In addition to the catalysts for hardening, other products may be present such as hardening activators, lubricants, additives.

However, the total quantity of such products may never exceed 5 percent by weight of composition.

Finally, a quantity of magnesium oxide not exceeding 1 percent by weight of the composition and preferably around 0.75 percent, is added.

Thus, compositions for pre-impregnates are obtained which reach viscosity levels at room temperature of above 100,000 c.p.s. and preferably above 300,000 c.p.s., in periods not exceeding 120 minutes.

These levels of viscosity are such that, even after a period of time not exceeding 2 months, the flow properties of the resin under pressure and temperature are not prejudiced.

Furthermore, the use of the unsaturated polyester resins of the present invention makes it possible for the compositions to attain values of equilibrium of viscosity in very short times at ambient temperature.

Such compositions, which have a rubbery consistency and are not tacky, are used in the preparation of pre-impregnates which can be used in a few hours just as easily as after a few months.

For this purpose, the compositions of the present invention must, within a short time and preferably within 2 hours, have added to them a reinforcing material, preferably glass fiber. The manufactured articles obtained after hot stamping of the pre-impregnate produced using the compositions of the present invention, are characterized not only by the absence of water absorption and tackiness but also by an improved resistance to atmospheric agents.

The invention will now be illustrated by the following examples which imply no limitation of any kind on the invention itself. Examples 1 to 6 are for comparison.

Example 1

Phthalic acid, maleic acid and propylene glycol in a molar ratio of 1:0.65:1.75 are reacted at a temperature of approx. 180° C in a reactor which is fitted with an agitator, until a resin is obtained which has an acidity number 45 and a viscosity of Gardner T—T ½. The viscosity was measured in toluene (70 percent) using a Gardner viscosimeter at 25° C. This resin, cooled to 100° C, was diluted with styrene containing 30 ppm hydroquinone and 40 ppm paratertiary butyl catechol, so as to achieve a final viscosity of 1,100 c.p.s. The viscosity was measured at 25° C with a Hubbelhode viscosimeter.

The gel time of the styrene-diluted resin, which we will henceforth referred to briefly as "resin" was 16 minutes at 25° C.

This was determined by mixing 0.2 ml 6 percent cobalt octoate with 100 g of the resin at 25° C. Subsequently, 1.5 ml 50 percent methyl ethyl ketone peroxide were added, and a chronometer was started. The process of gelling was observed by immersing a glass rod in the resin every 30 seconds. When the resin adhered to the rod, the chronometer was stopped and the length of time read.

90 parts by weight of resin were then placed in a steel vessel fitted with a Cowles type high-speed disperser and 60 parts by weight ventilated calcium carbonate, 6 parts talc, 5 parts rutile, 2 parts zinc stearate, 1 part silicon dioxide known commercially as Aerosil 380 manufactured by Messrs. Degussa and 1 part of the tertiary butyl perbenzoate product known as Trigonox C of Messrs. Noury, Italy were added under brisk agitation to the point of complete dispersion.

Using a Brookfield ABF viscosimeter, the viscosity of the resultant composition was checked. After the viscosity had been raised to 9,000 c.p.s. by styrene, magnesium oxide was added at 25° C in a quantity such that its content in the composition was equal to 0.5 percent by weight. From that moment on, the time was counted and also the relative level of viscosity, using a No. 2 reel and speed 2. The results are shown in Table 1 attached.

EXAMPLES 2 AND 3

The same procedure was adopted as in Example 1, magnesium oxide finally being added to the composition in such a quantity that its content in the composition was equal to 0.75 and 1 percent by weight respectively. The results are shown in Table 1 attached.

EXAMPLE 4

Phthalic acid, maleic acid and propylene glycol in a molar ratio of 1:1.1:2.25 were added to a reactor fitted with an agitator and caused to react at a temperature of approx. 160° C until a resin was obtained which has an acidity count of 50 and a viscosity, measured on the Gardner scale as in Example 1, equal to W ½ — X. This resin, cooled to 100° C, was diluted with styrene containing 30 ppm p-tertiary butyl catechol and 40 ppm hydroquinone, so as to have a final viscosity at 25° C of 1,500 c.p.s. The gel time at 25° C was equal to 14 minutes. The tests were carried out as described in Example 1. Then, a similar procedure was adopted to that described, again in Example 1. The results are shown in Table 1 attached.

EXAMPLES 5 AND 6

The same conditions were applied as in the previous example, magnesium oxide finally being added to the composition in a quantity such that its content in the composition was equal to 0.75 and 1 percent by weight respectively. The results are shown in Table 1 attached.

EXAMPLE 7

Phthalic acid, maleic acid, propylene glycol and monopentaerythritol in a molar ratio of 1:1:2.1:0.09 are made to react in a reactor fitted with an agitator, at a temperature of approx. 180° C until a resin with an acidity number of 30 and a viscosity equal to $Z_3$ ½ — $Z_4$, measured on the Gardner scale as in Example 1, was obtained. This resin, cooled to 100° C, was diluted with styrene, containing 150 ppm hydroquinone and 50 ppm p-tertiary butyl catechol, so as to have a final viscosity at 25° C of 1,500 c.p.s. The gel time at 25° C proved equal to 15 minutes. The measurements were conducted as described in Example 1. Then, the same procedure was followed as in Example 1.

For measuring the viscosity of the composition, the Brookfield ABF viscosimeter was used and, after the addition of magnesium oxide in such a quantity that its content in the composition equalled 0.5 percent, the length of time was counted and the relative viscosity level recorded with a No. 2 reel and speed 2 for values of viscosity up to 50,000 c.p.s. and with a No. 5 reel and speed 2 for levels of viscosity exceeding 50,000 c.p.s. The results found are shown in Table 1 attached.

EXAMPLES 8 AND 9

The same conditions were applied as in the preceding example, magnesium oxide finally being added to the resultant composition in such a quantity that its content in the composition equalled 0.75 and 1 percent by weight respectively. The results are shown in Table 1 attached.

| Examples | 1 | 2 | 3 | 4 |
|---|---|---|---|---|
| % magnesium oxide | 0.5 | 0.75 | 1 | 0.5 |
| Viscosity × $10^{-3}$ | | | | |
| — initial | 10.0 | 11.0 | 12.3 | 10.4 |
| — after 5' | 10.5 | 11.7 | 12.6 | 10.8 |
| — " 10 ' | 10.6 | 11.6 | 12.5 | 10.9 |
| — " 20' | 10.4 | 11.7 | 12.6 | 10.95 |
| — " 30' | 10.35 | 11.6 | 12.7 | 11.1 |
| — " 40' | 10.5 | 11.55 | 12.6 | 11.0 |
| — " 60' | 10.6 | 11.7 | 12.6 | 11.2 |
| — " 120' | 10.5 | 11.7 | 12.6 | 11.2 |

| Examples | 5 | 6 | 7 | 8 | 9 |
|---|---|---|---|---|---|
| % magnesium oxide | 0.75 | 1 | 0.5 | 0.75 | 1 |
| Viscosity × $10^{-3}$ | | | | | |
| — initial | 11.2 | 10.6 | 9.8 | 11.0 | 8.7 |
| — after 5' | 11.5 | 11.2 | 12.7 | 14.5 | 15.3 |
| — " 10' | 11.7 | 11.5 | 14.4 | 18.8 | 21.6 |
| — " 20' | 11.7 | 11.9 | 16.2 | 23.6 | 43.0 |
| — " 30' | 11.6 | 12.1 | 20.0 | 32.0 | 89.0 |
| — " 40' | 11.8 | 12.2 | 24.4 | 41.7 | 178.0 |
| — " 60' | 12.0 | 12.4 | 39.6 | 84.0 | 430.0 |
| — " 120' | 12.0 | 12.4 | 48.0 | 320.0 | 900.0 |

What we claim is:

1. In a process for producing an unsaturated polyester resin composition useful as a pre-impregnate in hot compression molding comprising:

reacting, by polycondensation reaction, a polyfunctional acid with a polyfunctional alcohol, with non-aromatic unsaturation being present in at least one of said reactants, in the presence of a saturated acid to produce an unsaturated polyester resin;

diluting the unsaturated polyester resin with an aryl vinyl compound;

adding to the diluted resin inert filler and a hardening catalyst; and increasing the viscosity of the resulting composition by adding thereto magnesium oxide; the improvement comprising producing a non-tacky and non-water-absorbing unsaturated polyester resin composition having improved resistance to atmospheric agents by a process which comprises:

a. conducting said polycondensation reaction to produce an unsaturated polyester resin having an acidity number of from 30 to 35 and a Gardner viscosity measured at room temperature and in 70 percent toluene, of from $Z_3$ to $Z_5$;

b. cooling the resin to at least 100° C. and then diluting with a quantity of styrene to produce a styrene-diluted resin having a viscosity, measured at 25° C. with a Hubbelhode viscosimeter, of from 500 to 2,000 cps;

c. adding to the styrene-diluted resin produced in step (b) with stirring, an amount of inert filler to provide a final resin content of from 50 to 60 percent by weight, based on the weight of the whole composition, and 0.5 to 3 parts by weight, based on the weight of unsaturated polyester resin of a hardening catalyst;

d. adding to the product of step (c), a quantity of magnesium oxide sufficient to provide a final magnesium oxide content of not more than 1 percent by weight, based on the weight of the whole composition, the magnesium oxide added during step (b) being all the magnesium that is added to the composition during its preparation; and e. allowing the product of step (d) to stand at room temperature for a period of time of not more than 2 hours, wherein the viscosity of the final product increases to above 100,000 cps.

2. The process of claim 1, wherein said polyfunctional acid comprises an unsaturated polycarboxylic acid, wherein said polyfunctional alcohol comprises a polyhydroxyl alcohol and wherein said polycarboxylic acid is reacted with said polyhydroxyl alcohol in the presence of a phthalic acid.

3. The process of claim 2, wherein said polycarboxylic acid is at least one member selected from the group consisting of maleic and fumaric acid, wherein said polyhydroxy alcohol is at least one member selected from the group consisting of ethylene glycol, propylene glycol and pentaerythritol, wherein said polycarboxylic acid is reacted with said polyhydroxy alcohol in a molar ratio of from 0.3:1 to 0.5:1 in the presence of a phthalic acid wherein the molar ratio between said polycarboxylic acid and said phthalic acid is from 0.5:1 to 2:1.

4. The process of claim 3, wherein the temperature during polycondensation reaction varies from 160° to 200° C.

5. The process of claim 3, wherein said hardening catalyst comprises a peroxide which decomposes at high temperature.

6. The process of claim 5, wherein said peroxide is selected from the group consisting of cumene hydroperoxide, ditertiary butyl perbenzoate, dicumyl peroxide and tertiary butyl peroxide.

7. The process of claim 3, wherein said inert filler is selected from the group consisting of carbonates, sulfates, kaolin, quartz, slate, titanium dioxide, mica and talcum.

8. The process of claim 3, further comprising adding during said step (c), with stirring, not more than 5 weight percent, based upon the weight of the whole composition, of at least one member selected from the group consisting of a hardening activator, a lubricant and other conventional additives.

9. The process of claim 3, wherein said composition achieves a viscosity during said step (e) of above 300,000 cps.

10. The process of claim 3, further comprising adding to said composition, during step (e), glass fibers which are impregnated during said step (e) by said composition undergoing the increase in viscosity.

11. A non-tacky and non-water-absorbing unsaturated polyester resin composition having improved resistance to atmospheric agents consisting essentially of:

50 to 60 parts by weight of an unsaturated polyester resin having an acidity number of from 30 to 35 and a Gardner viscosity, measured at room temperature and in 70 percent toluene, of from $Z_3$ to $Z_5$, said unsaturated polyester resin being diluted with a quantity of styrene to produce a diluted resin having a viscosity, measured at 25° C. with a Hubbelhode viscosimeter, of from 500 to 2,000 cps;

40 to 50 parts by weight of inert filler;

0.5 to 3 parts by weight per 100 parts by weight of said unsaturated polyester resin of a hardening catalyst; and not more than 1 part by weight of magnesium oxide, said composition being produced by a process which comprises;

a. forming said unsaturated polyester resin by a polycondensation reaction of an unsaturated polycarboxylic acid with a polyhydroxy alcohol in the presence of a saturated acid;

b. diluting the resulting resin with styrene to produce said viscosity after cooling the resin to at least 100° C.;

c. adding to the styrene-diluted resin said inert filler and said hardening catalyst;

d. adding to the resulting product said magnesium oxide, the magnesium oxide added during this step being all of the magnesium that is added to the composition during preparation; and e. allowing the resulting product to stand at room temperature for not more than 2 hours wherein the viscosity of the resulting composition increases to above 100,000 cps.

12. The polyester resin composition of claim 11, wherein the viscosity of said composition is greater than 300,000 cps.

13. The polyester resin composition of claim 11, wherein said unsaturated polyester resin is obtained by a polycondensation reaction at a temperature of from 160° to 200° C. between from 0.3 to 0.6 moles, per mole of polyhydroxy alcohol, at least one polycarboxylic acid selected from the group consisting of maleic and fumaric acids and at least one polyhydroxy alcohol selected from the group consisting of ethylene glycol, propylene glycol and pentaerythritol, said polycondensation reaction being conducted in the presence of a phthalic acid with the molar ratio between said polycarboxylic acid and said phthalic acid being from 0.5:1 to 2:1.

14. The polyester resin composition of claim 13 wherein said hardening catalyst comprises a peroxide that decomposes at high temperature.

15. The polyester resin composition of claim 14 wherein said peroxide is selected from the group consisting of cumene hydroperoxide, ditertiary butyl perbenzoate, dicumyl peroxide and tertiary butyl peroxide.

16. The polyester resin composition of claim 13, wherein said inert filler is selected from the group consisting of carbonates, sulfates, kaolin, quartz, slate, titanium dioxide, mica and talcum.

17. The polyester resin composition of claim 13, which further contains not more than 5 parts weight, based upon the weight of the entire composition, of at least one member selected from the group consisting of a hardening activator, a lubricant and other conventional additives.

* * * * *